United States Patent [19]

Kilian et al.

[11] 4,225,016
[45] Sep. 30, 1980

[54] HYDRAULIC DECELERATOR WITH SEGMENTED CYLINDER

[75] Inventors: John P. Kilian, Ineirlik, Turkey; John A. Brown, Kettering, Ohio

[73] Assignee: The United States of America as represented by the Secretary of the Air Force, Washington, D.C.

[21] Appl. No.: 15,382

[22] Filed: Feb. 26, 1979

[51] Int. Cl.³ ............................................. F16F 57/00
[52] U.S. Cl. ........................................ 188/38; 188/33
[58] Field of Search ................... 188/1 R, 2 R, 5, 33, 188/38, 8, 270, 282; 114/145 A, 145 R

[56] References Cited
U.S. PATENT DOCUMENTS

| | | | |
|---|---|---|---|
| 1,065,506 | 6/1913 | Constantin | 188/270 X |
| 2,844,220 | 7/1958 | Muehlner | 188/38 |

*Primary Examiner*—Duane A. Reger
*Attorney, Agent, or Firm*—Joseph E. Rusz; Richard J. Killoren

[57] ABSTRACT

A hydraulic decelerator having a waterbrake cylinder positioned within a reservoir wherein the cylinder is made up of a plurality of cylinder segments which are secured to a solid block member with four rods. The interfaces of the segments are ground and polished to provide a smooth close fit. Each segment includes bore holes in a predetermined pattern in the top and two sides with orifice or plug inserts being threaded into the holes. Internally threaded captive ring members are held between semicircular channels at the adjoining surfaces of the channels. Transition orifice inserts are threaded into the ring members. A frangible membrane is secured between the first segment and piston guide assembly secured to the first segment. The reservoir is filled with water, including a rust inhibiter, to a level of about ¼ inch above the segmented waterbrake cylinder such as to completely fill the cylinder with water.

4 Claims, 9 Drawing Figures

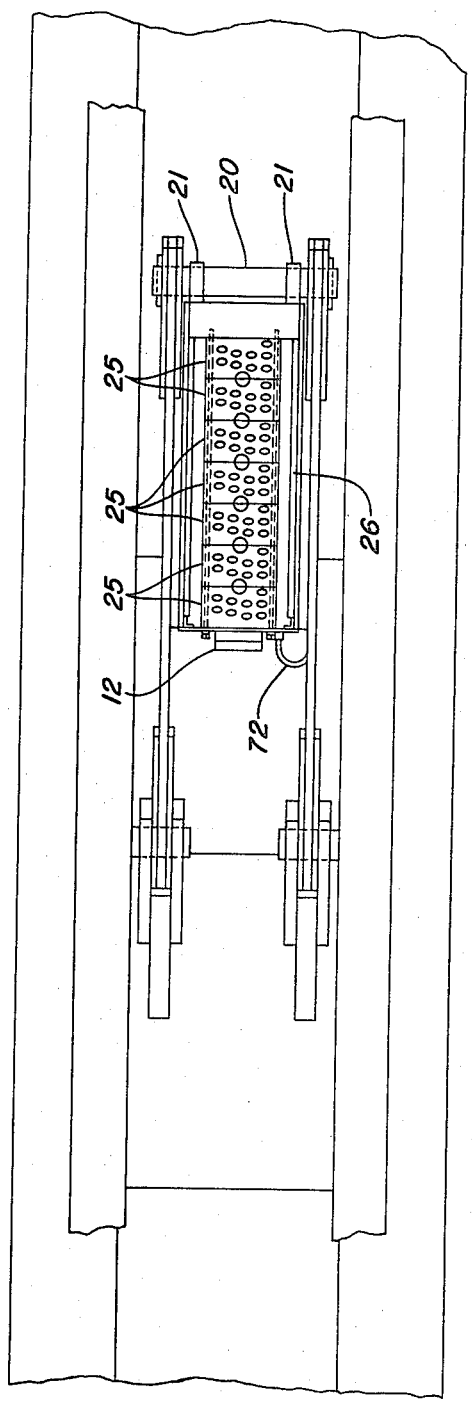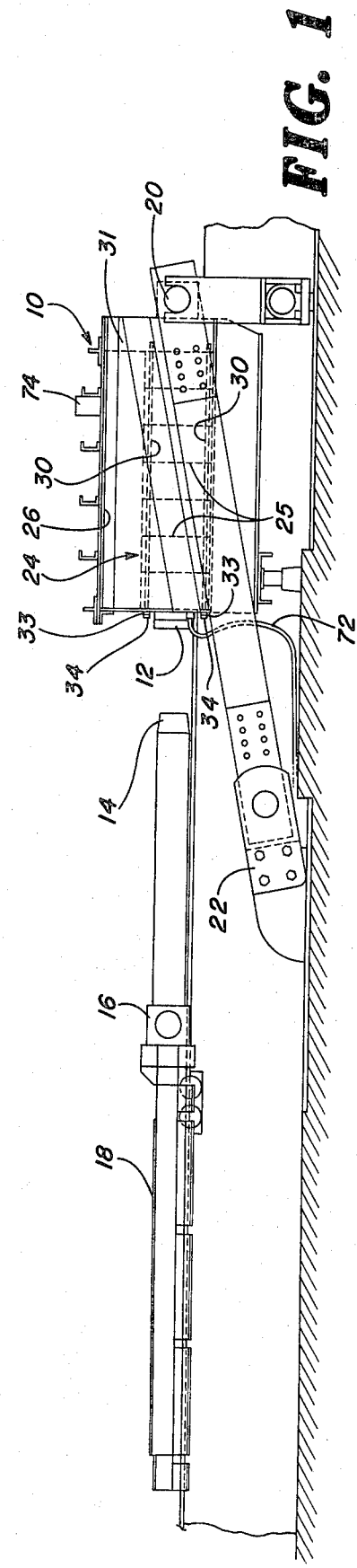

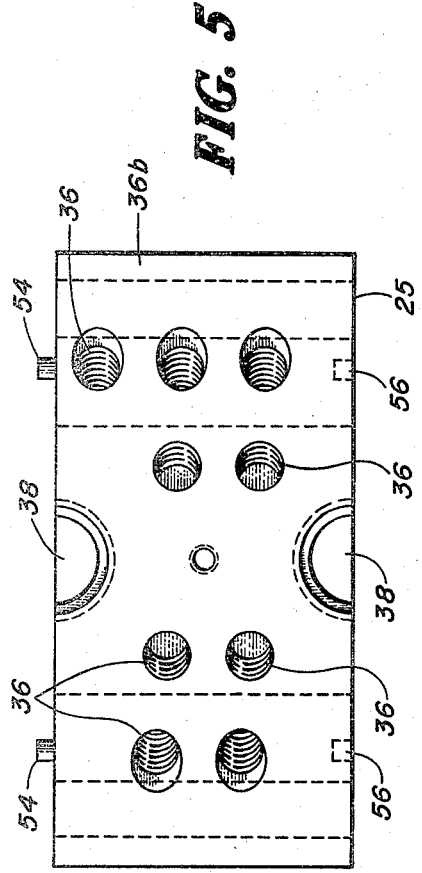
FIG. 5
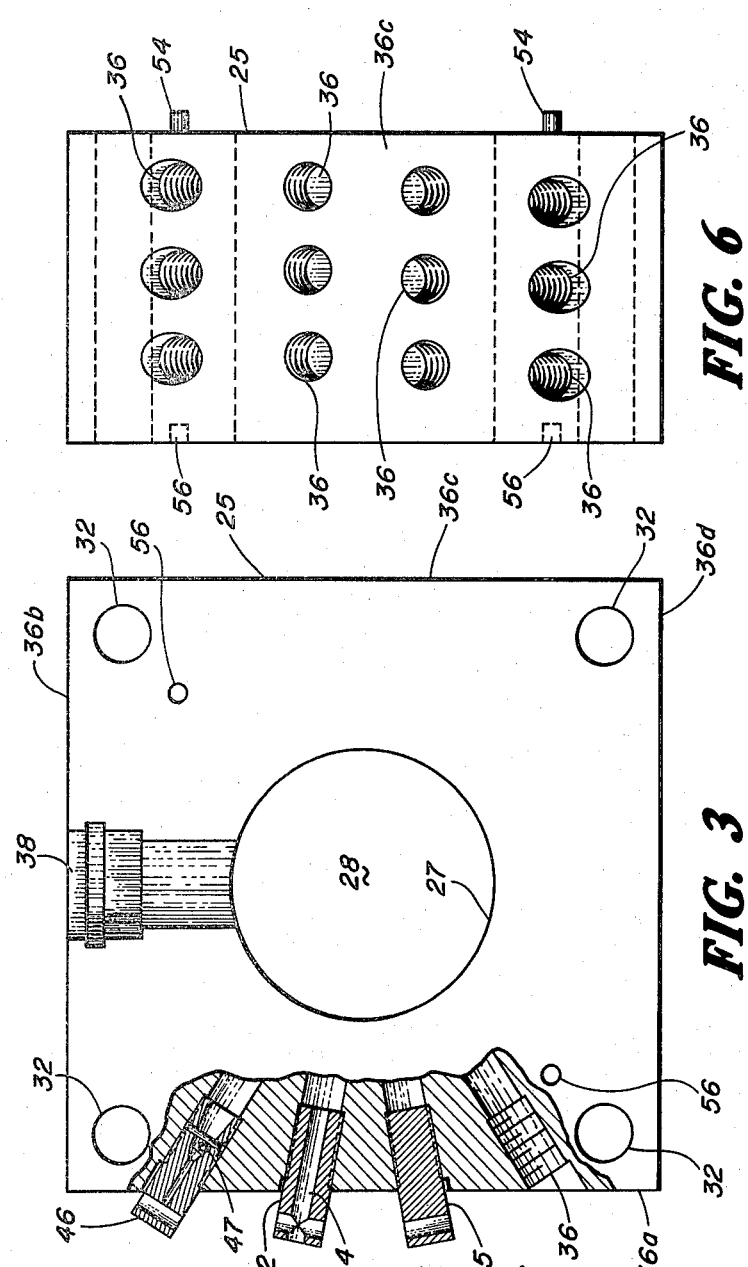
FIG. 6
FIG. 3
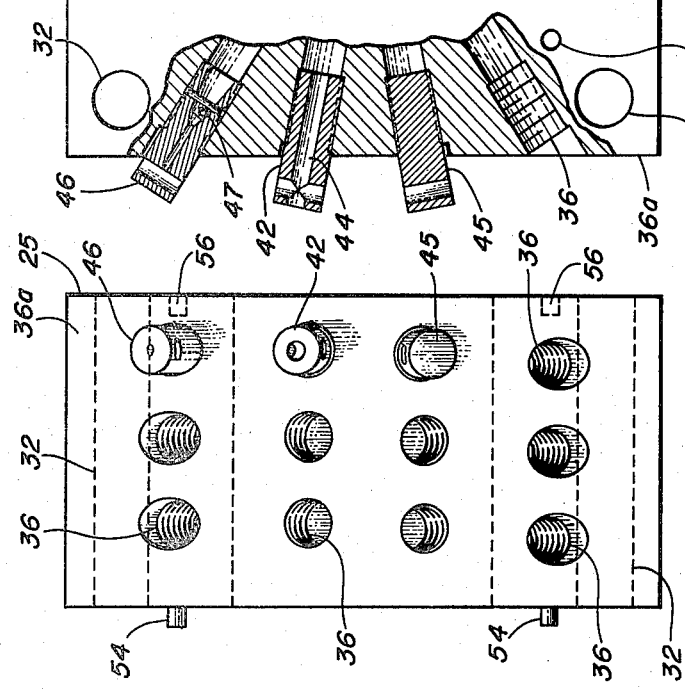
FIG. 4

FIG. 7
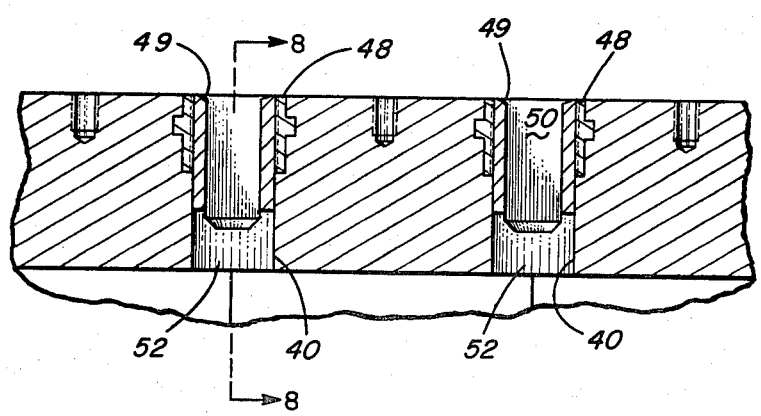
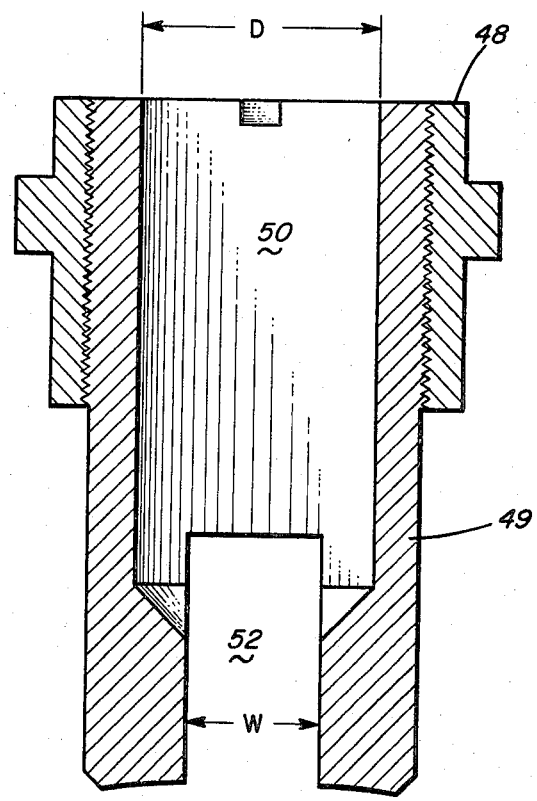
FIG. 8

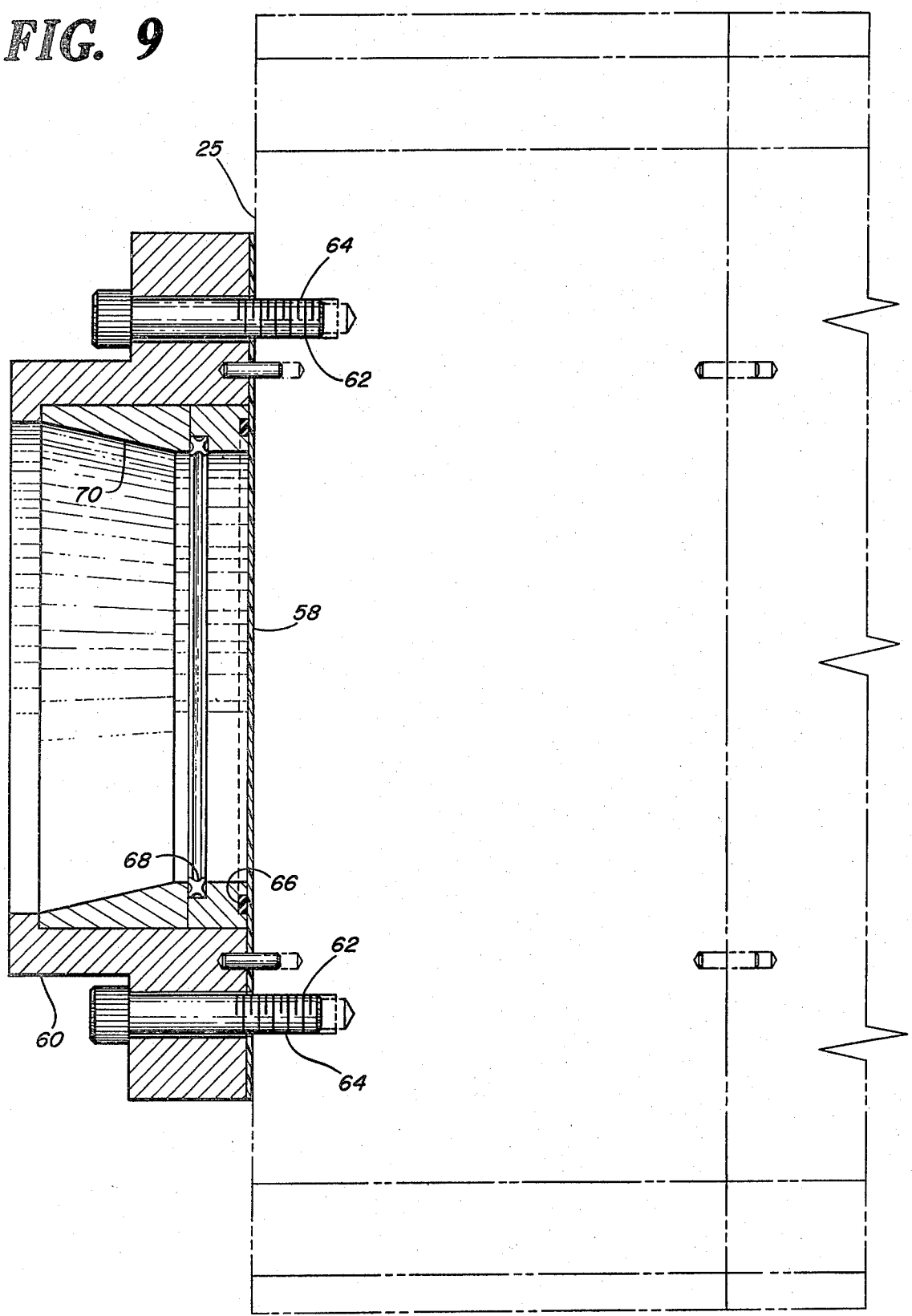

HYDRAULIC DECELERATOR WITH SEGMENTED CYLINDER

RIGHTS OF THE GOVERNMENT

The invention described herein may be manufactured and used by or for the Government of the United States for all governmental purposes without the payment of any royalty.

BACKGROUND OF THE INVENTION

This invention relates to a waterbrake cylinder for use in the deceleration of a test sled.

Waterbrakes for test sleds include a braking cylinder which receives a piston secured to the test sled and has an inside diameter corresponding to the diameter of the sled piston. The cylinder is filled with water and is permanently closed with a thin plastic membrane. Prior art cylinders have radial holes drilled in the top portion of the cylinder. The holes are threaded to receive either small orifices or plugs so that the area for discharge of water may be varied.

When the front of the sled piston engages the waterbrake, the piston breaks the plastic membrane and enters the waterbrake cylinder. The piston increases the water pressure in the cylinder which causes the sled to decelerate and causes water to discharge through the orifices. As the piston passes each orifice opening, the orifice becomes closed off, leaving only the remaining downstream orifices for the escape of water. This provides, in effect, an orifice area which is a function of the deceleration distance. The operation of the brake depends on the transfer of energy from the moving sled to moving water.

Waterbrake cylinders having a spiral pattern of openings drilled in the cylinder have been proposed.

BRIEF SUMMARY OF THE INVENTION

According to this invention, a waterbrake for a test sled is provided wherein the cylinder is made up of a plurality of interchangeable segments. Each segment includes a plurality of orifices positioned in a partial spiral pattern in three quadrants. Rods pass through four corners of the segments to hold the segments together. Transition orifices are provided between segments. A reservoir surrounds the assembled waterbrake cylinder for receiving the water flowing through the orifices. The segments can be changed to provide an almost infinite variety of deceleration profiles, limited only by the ultimate strength of the device and the length of the deceleration cylinder.

IN THE DRAWINGS

FIG. 1 is a side view of a test sled deceleration system with the waterbrake cylinder of the invention.

FIG. 2 is a top view of the device of FIG. 1 with the top cover removed.

FIG. 3 is a partially cutaway front view of one of the segments of the waterbrake cylinder of FIGS. 1 and 2.

FIG. 4 is a left side view of the device of FIG. 3.

FIG. 5 is a top view of the device of FIG. 3.

FIG. 6 is a right side view of the device of FIG. 3.

FIG. 7 is a partially cutaway sectional view of a plurality of waterbrake segments for the device of FIG. 1.

FIG. 8 is an enlarged sectional view of the orifice inserts and ring member along the line 8—8 of FIG. 7.

FIG. 9 is a partially schematic view showing the front waterbrake segment with the guide assembly attached.

DETAILED DESCRIPTION OF THE INVENTION

Reference is now made to FIG. 1 of the drawing which shows a waterbrake 10 having a guide member 12 adapted to receive the forward end 14 of ram assembly 16 for the test sled 18. The waterbrake 10 abuts a thrust pin 20 of thrust absorbing mechanism 22.

The waterbrake assembly includes a waterbrake cylinder 24, including a plurality of segments 25 positioned within a water reservoir 26, as shown in greater detail in FIG. 2, wherein the top cover of the reservoir is removed. The thrust pin is secured to the reservoir 26 by support brackets 21.

Each of the waterbrake cylinder segments is constructed as shown in FIGS. 3-6. The segments are made of a low carbon steel, such as 1020 steel plate and has the inner surface 27, of the cylinder openings 28, cadmium plated. In the device constructed, the segments 25 are 16″ on each side and are 8″ long. The openings 28 have a diameter of 7.020 inches to receive the ram piston having a diameter of 7.000 inches. The interfaces of the segments were ground and polished to provide a smooth close fit when the segments are joined together. Rod members 30 are threaded into the solid block member 31 and pass through holes 32 in the segments. The block member 31 forms the back wall of reservoir 26 and has brackets 21 secured to it. Washers 33 are placed on the rod ends and the segments are drawn together by nuts 34.

Each of the cylinder segments 25, as shown in FIGS. 3-6, includes in addition to holes 32 and the opening 28 a plurality of threaded holes 36. The holes 36 are positioned in three sides, 36A, 36B and 36C of the segments 25. There are no holes in the bottom 36D of the segments. The holes in each side when taken with the holes in the other two sides form a partial spiral pattern. Semicircular channels 38 are cut in opposite ends of the top of the segments in all of the segments except the two end segments which have only one channel each. The semicircular channels mate with corresponding channels in adjacent segments to form holes 40.

One type of orifice insert that can be threaded into holes 36 is shown at 42. The diameter of orifice 44 is selected for the particular deceleration program disired. Plug inserts 45 or vented plugs 46 with ball checks 47 may also be threaded into holes 36. The vented plugs are used above the horizontal center line of the waterbrake cylinder and aid in filling the cylinder. The ball check will allow air to pass but will be closed by the water pressure in the waterbrake cylinder during the braking operation.

An internally threaded ring member 48 is positioned in each of the holes 40 during the assembly of the waterbrake cylinder. The ring member is held captive between the two adjacent cylinder segments as shown in FIG. 7. An orifice insert member 49 is threaded into each ring member 48. For some tests, the insert 49 is omitted in the hole 40 near the forward end of the waterbrake cylinder.

The insert 49 includes a cylindrical channel 50 and an elongated transition slot 52. The greatest dimension of slot 52 is oriented along the direction of sled ram piston travel within the cylinder. The width W of the slot 52 is selected to provide a slot area equal to the area D of channel 50. Alignment pins 54 on the segments fit into matching holes 56 on adjacent segments.

A frangible membrane 58 is sealed between the piston guide assembly 60 and the first segment 25. In the device constructed the membrane used was a 6 mil polyethylene material.

The front segment 25 includes four threaded holes 62, two of which are shown, for receiving screws 64, two of which are shown in FIG. 9, which secure the guide assembly 60 to the waterbrake cylinder 24. An O-ring seal 66 and a Quad-Ring seal 68 are provided in the guide assembly. The guide assembly includes a cam guide taper section 70 which received a corresponding cam guide external taper member on the piston.

A water fill tube 72 is connected to the water reservoir 26. The reservoir also includes a vent tube 74.

In the operation of the device, rods 30 are threaded into block member 31 and tightened in place. Each segment 25 then has the desired orifices, plugs and vented plugs inserted into the holes 36. The segments are then placed on rods 30 with ring members 48 positioned in holes 40. The forward reservoir panel is then placed over the bolts and washers 33 are placed on the bolt ends. Nuts 34 are then placed on the bolts and tightened to draw the segments together. The reservoir forward panel and top cover are then bolted to the reservoir with sealing material, not shown, in the joints. Sealing material is also placed between the front segment and the forward panel of the reservoir. The frangible membrane is then placed on the piston guide assembly 60 and the assembly is secured to the forward segment of the cylinder assembly.

After the reservoir and waterbrake cylinder are assembled and sealed, the reservoir and waterbrake cylinder are filled with water with a rust inhibiter to a level of about ¼ inch above the top of the waterbrake cylinder segments 25, as the brake cylinder air escapes through vented plugs 46, orifice inserts 42 and inserts 49.

When the sled ram piston enters the guide member 60, it first passes seal 68 and then moves on to break the frangible membrane 58. After breaking the membrane 58, the piston forces water through the orifice inserts 42 and 49. The slot 52, which extends in the direction of travel, acts as transition orifices between the orifices 42 in one segment and the orifices 42 in the next segment. The waterbrake acts to transfer the energy of the moving sled to the water moving through the orifices. The orifice pattern in the segmented cylinder determines the shape and magnitude of the deceleration profile for a given entry velocity and impact sled mass. When needed, one or more waterbrake cylinder segments can be exchanged with segments having other orifice patterns than that shown. To provide a smooth entry of the piston into the waterbrake cylinder, it is desirable to have the total area of the orifices 44 and 50 approximately equal to the area of the forward end of the piston. The close fit between segments 25 will eliminate substantially all leakage between segments; however, any leakage that might occur will amount to only a slight increase in the effective total orifice area for the water leaving the waterbrake cylinder and is not detrimental to the operation of the waterbrake device.

There is thus provided a hydraulic decelerator with interchangeable cylinder segments to permit changes in orifice patterns.

We claim:

1. In a hydraulic decelerator system for use in the deceleration of a test sled having a ram piston which breaks a membrane over the entrance of a waterbrake cylinder and enters the cylinder to force water through a plurality of orifices in the waterbrake cylinder to thereby decelerate the test sled, a waterbrake cylinder assembly, comprising: a water reservoir; a thrust absorbing system secured to said reservoir; a plurality of cylinder segments within said reservoir; means for holding said segments in close engagement with the adjacent segments; means for forming a plurality of orifices in a predetermined pattern in the walls of each segment; means for forming a transition orifice at the junction of adjoining segments; a frangible membrane; means, including a piston guide assembly for securing said membrane to the forward end of the waterbrake cylinder; said reservoir being filled with water to a predetermined level above said cylinder with the water also filling said cylinder.

2. The device as recited in claim 1 including a solid block member forming the back wall of said reservoir and engaging said thrust absorbing mechanism; said means for holding said segments in close engagement including rod means for securing said segments to said solid block member.

3. The device as recited in claim 2 wherein the orifices in each of said cylinder segments are positioned in a partial spiral pattern in the three upper quadrants including the top and side walls.

4. The device as recited in claim 3 wherein said means for forming a transition orifice at the junction of adjoining segments includes an internally threaded ring member held captive by each two adjoining segments; an orifice insert within each of said ring members; said orifice insert in each ring member including a cylindrical channel and an elongated slot extending along the direction of piston travel within said cylinder.

* * * * *